(12) United States Patent
Burstein

(10) Patent No.: US 8,370,786 B1
(45) Date of Patent: Feb. 5, 2013

(54) METHODS AND SOFTWARE FOR PLACEMENT IMPROVEMENT BASED ON GLOBAL ROUTING

(75) Inventor: Michael Burstein, Cupertino, CA (US)

(73) Assignee: Golden Gate Technology, Inc., San Jose, CA (US)

( * ) Notice: Subject to any disclaimer, the term of this patent is extended or adjusted under 35 U.S.C. 154(b) by 0 days.

(21) Appl. No.: 13/149,275

(22) Filed: May 31, 2011

Related U.S. Application Data

(60) Provisional application No. 61/349,800, filed on May 28, 2010.

(51) Int. Cl.
*G06F 17/50* (2006.01)

(52) U.S. Cl. ........ 716/134; 716/110; 716/111; 716/113; 716/119; 716/122; 716/123; 716/126; 716/129; 716/130; 716/132

(58) Field of Classification Search .................. 716/110, 716/111, 113, 119, 122, 123, 126, 129, 130, 716/132, 134
See application file for complete search history.

(56) References Cited

U.S. PATENT DOCUMENTS

| | | | | |
|---|---|---|---|---|
| 4,593,363 | A * | 6/1986 | Burstein et al. | 716/122 |
| 5,483,461 | A * | 1/1996 | Lee et al. | 716/119 |
| 5,625,568 | A * | 4/1997 | Edwards et al. | 716/122 |
| 5,856,927 | A * | 1/1999 | Greidinger et al. | 716/122 |
| 6,067,409 | A * | 5/2000 | Scepanovic et al. | 716/122 |
| 6,169,968 | B1 * | 1/2001 | Kabuo | 703/14 |
| 6,170,080 | B1 * | 1/2001 | Ginetti et al. | 716/104 |
| 6,230,304 | B1 * | 5/2001 | Groeneveld et al. | 716/113 |
| 6,292,929 | B2 * | 9/2001 | Scepanovic et al. | 716/118 |
| 6,301,686 | B1 * | 10/2001 | Kikuchi et al. | 716/122 |
| 6,324,674 | B2 * | 11/2001 | Andreev et al. | 716/129 |
| 6,415,426 | B1 * | 7/2002 | Chang et al. | 716/113 |
| 6,415,427 | B2 * | 7/2002 | Nitta et al. | 716/129 |
| 6,480,991 | B1 * | 11/2002 | Cho et al. | 716/122 |
| 6,651,236 | B2 * | 11/2003 | Ichimiya et al. | 257/203 |
| 6,810,442 | B1 * | 10/2004 | Lin et al. | 710/22 |
| 7,080,336 | B2 * | 7/2006 | Teig et al. | 716/122 |
| 7,089,510 | B2 * | 8/2006 | Correale et al. | 716/133 |
| 7,089,521 | B2 * | 8/2006 | Kurzum et al. | 716/122 |
| 7,127,696 | B2 * | 10/2006 | Alpert et al. | 716/114 |
| 7,216,325 | B2 * | 5/2007 | Ohshige | 716/126 |
| 7,260,804 | B1 * | 8/2007 | Burstein et al. | 716/104 |
| 7,266,796 | B1 * | 9/2007 | Chu et al. | 716/123 |

(Continued)

OTHER PUBLICATIONS

Burstein et al.; "Hierarchical Channel Router"; Publication Year: 1983; Design Automation, 1983. 20th Conference on; pp. 591-597.*

(Continued)

*Primary Examiner* — Helen Rossoshek
(74) *Attorney, Agent, or Firm* — The Law Offices of Andrew D. Fortney; Andrew D. Fortney

(57) ABSTRACT

Methods and software for placing or re-placing integrated circuit cells and routing or re-routing nets between the cells in an integrated circuit layout. The method includes selecting a region of the cells in the integrated circuit layout, selecting a cell within the selected region, locating a border point where a net coupled to the selected cell crosses a border of the selected region, and moving the selected cell within the selected region to improve a timing characteristic (e.g., a wire length, capacitance, or other characteristic of the net that affects timing or delay) of the net. The method and software advantageously improve the placement of cells and routing of wires around congested or reserved regions after global routing has been performed, without causing timing violations in other signal paths on the integrated circuit device, in a computationally efficient manner.

20 Claims, 8 Drawing Sheets

U.S. PATENT DOCUMENTS

| | | | |
|---|---|---|---|
| 7,360,193 B1* | 4/2008 | Burstein et al. | 716/122 |
| 7,503,026 B2* | 3/2009 | Ichiryu et al. | 716/130 |
| 7,721,234 B2* | 5/2010 | Lee et al. | 716/136 |
| 7,805,697 B2* | 9/2010 | Wood | 716/113 |
| 7,823,112 B1* | 10/2010 | Makarov et al. | 716/129 |
| 7,921,393 B2* | 4/2011 | Furnish et al. | 716/110 |
| 7,971,174 B1* | 6/2011 | Khalsa et al. | 716/129 |
| 7,992,122 B1* | 8/2011 | Burstein et al. | 716/131 |
| 8,010,925 B2* | 8/2011 | Buehler et al. | 716/119 |
| 8,015,533 B1* | 9/2011 | Burstein et al. | 716/126 |
| 8,056,042 B2* | 11/2011 | Miyagawa | 716/129 |
| 8,069,425 B2* | 11/2011 | Hutchings et al. | 716/103 |
| 8,099,700 B1* | 1/2012 | Waller et al. | 716/126 |
| 8,108,809 B2* | 1/2012 | Sadakane et al. | 716/103 |
| 8,185,860 B2* | 5/2012 | Burstein et al. | 716/126 |
| 2009/0249266 A1* | 10/2009 | Pierrat et al. | 716/4 |

OTHER PUBLICATIONS

Ling et al.; "Incremental placement for structured ASICs using the transportation problem"; Publication Year: 2007; Very Large Scale Integration, 2007. VLSI-SoC 2007. IFIP International Conference on; pp. 172-177.*

Viswanathan et al.; "FastPlace: efficient analytical placement using cell shifting, iterative local refinement and a hybrid net model"; Apr. 2004; ISPD '04: Proceedings of the 2004 international symposium on Physical design; Publisher: ACM; pp. 26-33.*

* cited by examiner

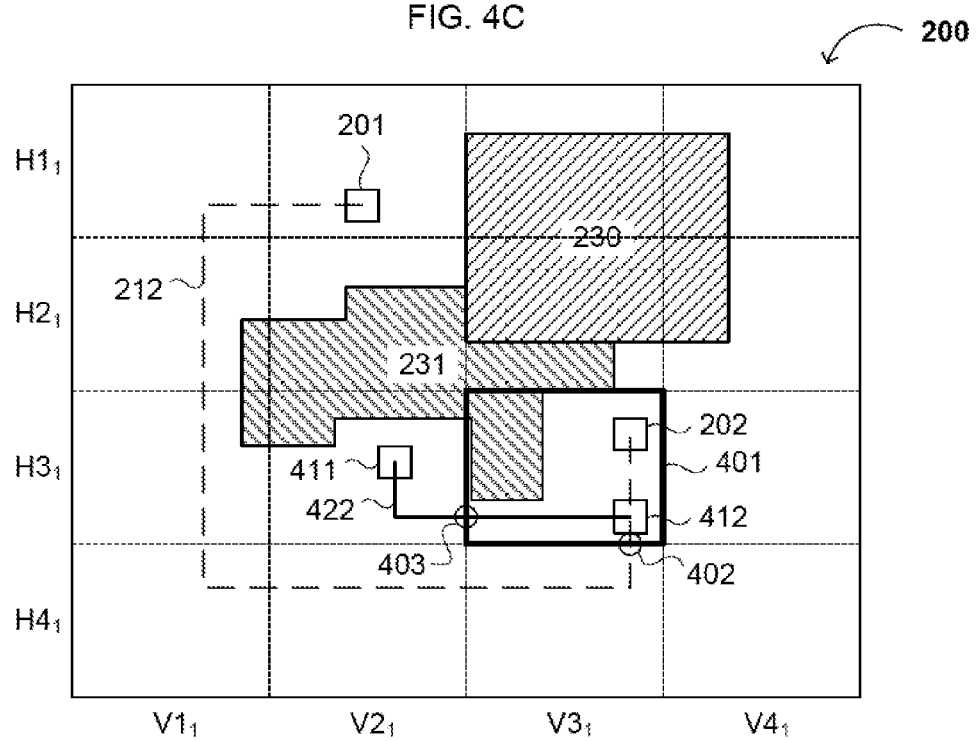
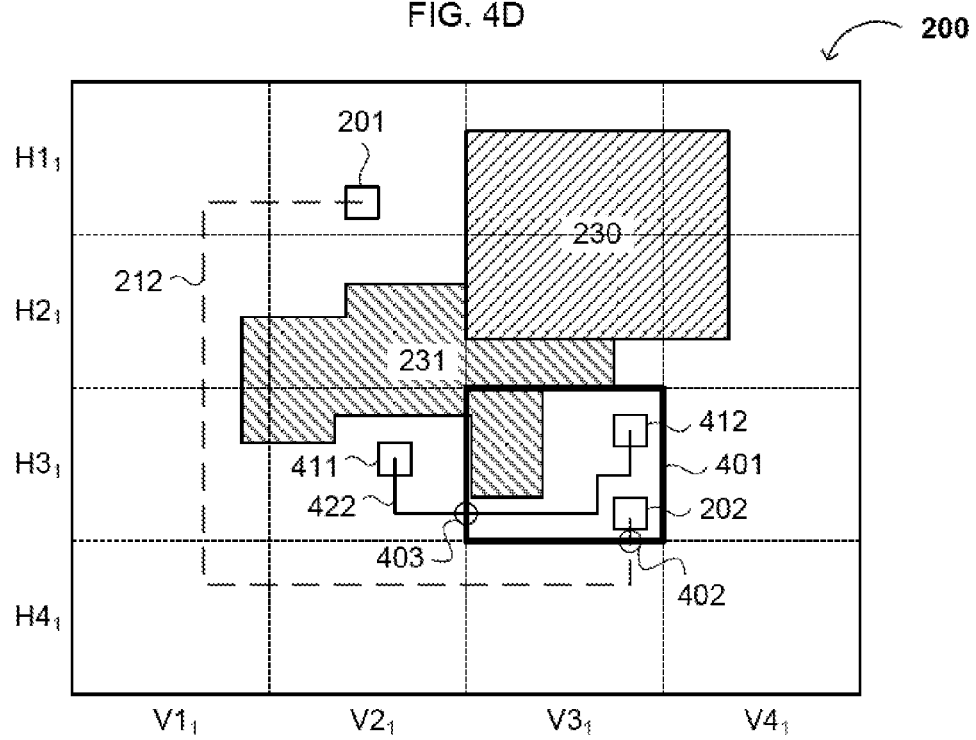

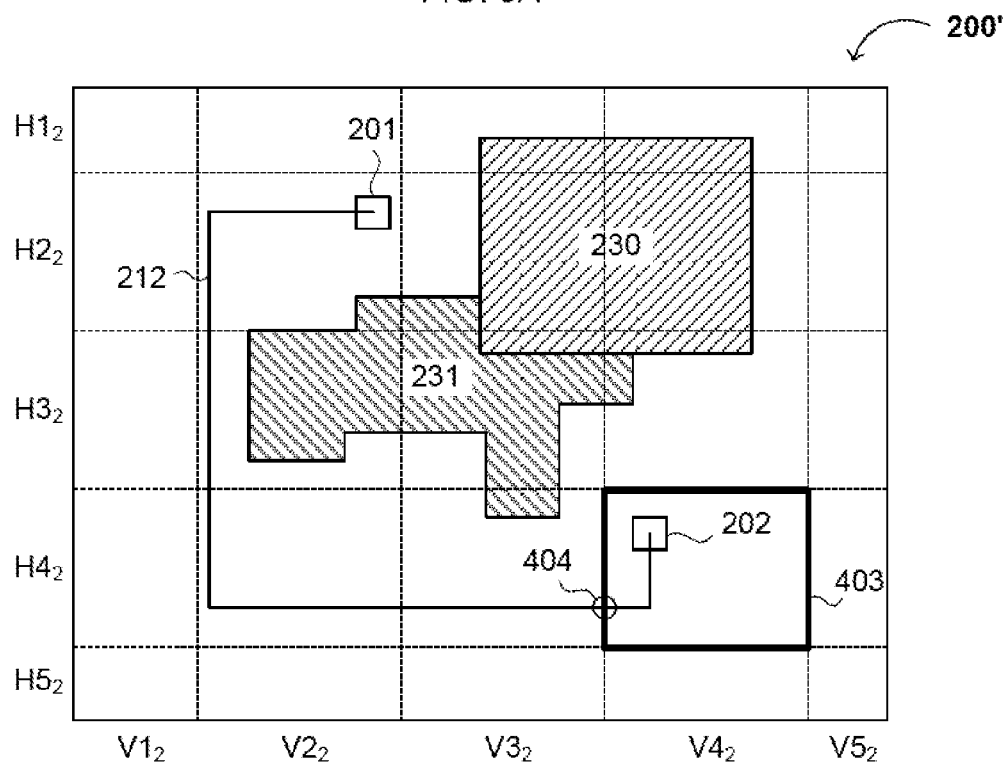
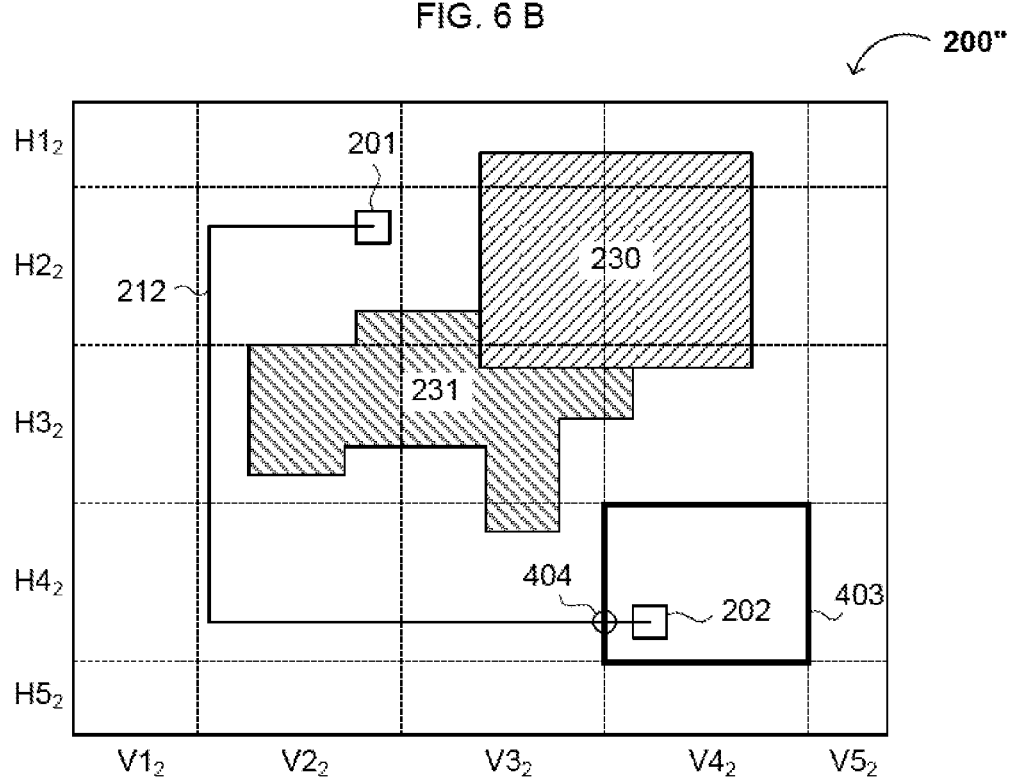

US 8,370,786 B1

METHODS AND SOFTWARE FOR PLACEMENT IMPROVEMENT BASED ON GLOBAL ROUTING

RELATED APPLICATIONS

This application claims the benefit of U.S. Provisional Patent Application No. 61/349,800, filed May 28, 2010, and incorporated herein by reference in its entirety.

FIELD OF THE INVENTION

The present invention generally relates to the field of circuit design, particularly integrated circuit (IC) design. More specifically, embodiments of the present invention pertain to methods, algorithms, software, systems, and architectures for automatically improving the placement of integrated circuit cells based on global routing information.

DISCUSSION OF THE BACKGROUND

In typical circuit design, circuit components are arranged to optimize space and/or circuit performance. Such arrangements can include the "layout" or pattern definition of each of the layers used in a semiconductor manufacturing process. For example, such layout(s) can include metal interconnect layers or metal connectivity layers that are converted to masks or reticles for use in a wafer fabrication facility that manufactures ICs (i.e., "chips").

While some circuits are designed using "custom" layout processes, others are designed using a partially or fully automated design flow. Application-Specific Integrated Circuit (ASIC) designs, as well as other functional blocks within a larger chip, such as System-On-Chip (SOC) designs, may employ custom and/or ASIC type flows on the same chip. In any event, typical ASIC flows use "place-and-route" tools for placing logic or circuit "blocks" and then "routing" or connecting the interface signals between the blocks. Such routing between circuit blocks is typically done using one or more metal connectivity layers for each signal path. In most modern ASIC designs, at least five layers of metal connectivity are employed.

Referring now to FIG. 1A, a logical diagram of a typical signal path is shown. A signal path generally has a plurality of circuit blocks (e.g., circuit blocks 101-105) with "nets" or wires 111-114 communicatively coupled between circuit blocks. A signal path generally has flip-flops or other state memory devices at each end of the path (e.g., circuit blocks 101 and 105), with logic gates or other logical operation circuit blocks between the flip-flops (e.g., circuit blocks 102-104). Typically, a signal path is designed and/or required to propagate a signal from a beginning flip-flop 101 to an ending flip-flop 105 during one clock pulse. Therefore, when the circuit blocks and nets of a signal path are placed and routed on an integrated circuit device, the propagation delay of the wires that form the nets must be taken into account.

In conventional place-and-route flows, circuit blocks or "cells" are first placed in desired locations and sized (e.g., had their drive strength adjusted by changing transistor sizes and/or adding buffer stages) in accordance with a projected routing and capacitive load based on these desired cell locations. Then, signals are actually routed between the circuit blocks. A standard cell is a specific design for each gate in the library. With advancements in integrated circuit fabrication processes, the routing area is becoming relatively more important than the total number of transistors used with respect to the overall area of ASIC designs. A modern ASIC design may comprise hundreds of thousands if not millions of cells and wires or nets. Therefore, the majority of ASIC routing is performed automatically and standard cell sizes are generally used to support place-and-route tools. Thus, referring now to FIG. 1B, circuit blocks 101-105 may be placed into cells of integrated circuit layout 120, where the height of each cell in rows R1 through R6 is the same height.

Although nets 111-114 are shown as straight logical interconnections between circuit blocks 101-105, wires are typically placed on horizontal and vertical wire tracks. For example, referring now to FIG. 2A, in integrated circuit layout 200 cells 201 and 202 may be ideally connected by straight path net 210. With most conventional routing tools, in the best case a net between cells 201 and 202 may be routed along a horizontal wiring track to form net portion 211a, then along a horizontal wiring track to form net portion 211b.

Cells are generally placed in an integrated circuit layout before detailed or "global" routing is performed. The placement is generally based on an estimate of the length of wire that will be necessary to couple the two cells (e.g., based on an approximate length of horizontal and vertical wire track that would be necessary to connect the two cells). However, routing resources may be limited so that when the nets are globally routed it may not be possible to route the net near the ideal path. In some cases, the actual route of the wire will not satisfy timing constraints for the net and/or for a signal path that includes the net. Routing resources are generally limited because wires in each metal layer may have a minimum width for each wire and a minimum spacing between each wire, depending on the manufacturing process limitations and the electrical characteristics of the metal. In addition, there is generally a limit on the number of wire layers available (e.g., typically six to eight metal layers), and some number of metal layers may be reserved for intra-cell routing (e.g., typically the bottom two to three layers).

When all of the routing resources in an area of an integrated circuit layout are used, the region may be referred to as "congested." No additional wires can be routed through a congested region. In addition, some regions of a layout may not be routed through because they contain hierarchical blocks of cells that are pre-placed and pre-routed. These hierarchical blocks may form memory devices, intellectual property cores licensed from third parties, or any other pre-placed and pre-routed multi-cell circuit blocks. In some cases, these hierarchical blocks may be congested. However, in many cases, the content of a hierarchical block is not known to the layout and routing process and/or software, and is treated as a black box through which one cannot route any wires/signals.

As shown in FIG. 2B, integrated circuit layout 200 may include a hierarchical block region 230 and/or a congested region 231. As a result, net 212 between cells 201 and 202 must be routed around regions 230 and 231, resulting in a path that is longer than was estimated when cells 201 and 202 were initially placed. Given the increasing demands on circuit designers to more quickly create chips of increasing density, decreasing wire and transistor widths, and decreasing power supply and power consumption, it is difficult to ensure that cells are placed so that nets meet timing and/or power requirements after global routing in an automated place-and-route flow. Increasing the complexity, flexibility, and/or functionality of the circuitry on a chip exacerbates these challenges.

Therefore, it is desirable to provide methods for automatically improving the placement of cells to improve routing around congested regions after global routing has been performed without thereby causing timing violations in other signal paths on the same integrated circuit device.

This "Background" section is provided for background information only. The statements in this "Background" are not an admission that the subject matter disclosed in this "Background" section constitutes prior art to the present disclosure, and no part of this "Background" section may be used as an admission that any part of this application, including this "Background" section, constitutes prior art to the present disclosure.

SUMMARY OF THE INVENTION

Embodiments of the present invention relate to methods and software for placing (or re-placing) integrated circuit cells and routing (or re-routing) nets between the cells in an integrated circuit layout. The method includes selecting a region of the integrated circuit layout, selecting a cell within the selected region, locating a border point where a net coupled to the selected cell crosses a border of the selected region, and moving (or re-placing) the selected cell within the selected region such that a timing characteristic (e.g., a wire length, capacitance, resistance, inductance, or other characteristic of the net that affects the timing or delay of the net) of a portion of the coupled net between the selected cell and the border point is improved.

In some embodiments, the method includes obtaining an initial placement of the cells and an initial routing of the nets of the integrated circuit layout. In preferred embodiments, the initial routing is a detailed routing of the nets. The detailed routing may include actual routing of the nets in one or more metal layers, and may include routing the net around congested or otherwise unavailable areas (e.g., around regions reserved for predesigned functional blocks such as memory). For example, the method may include performing a layout and detailed routing of the cells and nets. Alternatively, the method may include retrieving a pre-determined placement of the cells and routing of the nets.

In another embodiment, the method includes determining whether moving (or re-placing) the selected cell causes timing violations in one or more signal paths of the integrated circuit layout. In some embodiments, the method includes determining boundary characteristics for nets in one or more signal paths of the integrated circuit. These boundary characteristics of the nets may include, for example, maximum capacitances of the nets. Alternatively, these boundary characteristics may include a maximum resistance, maximum inductance, or maximum length. Thus, determining whether moving the selected cell causes timing violations may include calculating new characteristics for affected nets (e.g., nets that are re-routed to accommodate the cell move or re-placement) and determining whether the new characteristics are within the boundary characteristics for the affected nets (e.g., determining whether the capacitances of the affected nets after re-routing are below the respective maximum capacitances). Thus, the method may also include determining new routes of nets in the integrated circuit layout in accordance with the move (e.g., re-routing nets coupled to the selected cell, as well as re-routing nets in other signal paths to accommodate the swap [e.g., the exchange of cell locations or the replacement of cells in new locations]).

In still another embodiment, the method includes dividing the integrated circuit layout into a plurality of regions (e.g., in a grid), where the selected region is one of these regions. In a further embodiment, after moving or re-placing the selected cell(s), the method may include dividing the integrated circuit layout into a new plurality of regions (e.g., a second grid), locating or identifying the new border point, and moving or re-placing the selected cell in the new selected region. These steps may be repeated, for example, until no further timing improvement (e.g., the total delay of wires between cells in the layout) is achieved or until the timing improvement falls below a predetermined threshold (e.g., in units of time, capacitance, or resistance, or as a percentage of tone or more of these units).

The present method is particularly advantageous for improving the timing of pre-placed and pre-routed signal paths. Thus, the present invention also relates to determining whether a net (e.g., a net between cells that have been placed and routed by conventional means) violates a timing constraint and, if the net violates the timing constraint, performing the present method(s) on one or more of the cells coupled to the net. Thus, the method may comprise selecting one or more nets that violate a timing constraint, dividing the layout into regions, performing the present method(s) on cells where the violating net(s) cross a region boundary, and repeating with different boundary divisions until no timing improvement (or less than a threshold improvement) is obtained.

The methods described herein may be embodied in software as computer readable media or a waveform comprising a computer executable set of instructions. In an exemplary embodiment of the software, obtaining an initial placement of the cells and an initial routing of the nets of the integrated circuit layout comprises reading and parsing an input file. In another embodiment, the input file may comprise a Design Exchange Format (DEF) file, a GDSII file, an OASIS file, or a LEF file. Alternatively, the software may include methods for performing an initial placement and routing of cells and nets based on a netlist interface file, such as Verilog Hardware Description Language (VHDL) or Very-High-Speed Integrated Circuit (VHSIC) Hardware Description Language. In another embodiment, the software includes instructions adapted to determine new routes of nets in the integrated circuit layout in accordance with the cell movements. Thus, the software may further comprise instructions adapted to produce an output file containing the new cell placement(s) and/or new wire routes (e.g., as a DEF output file, a GDSII file, an OASIS file, or a LEF file, which may be the same or difference format as the input file).

Thus, the present invention provides methods and software for placing and routing (or re-placing and re-routing) one or more cells and/or signal paths in an integrated circuit layout. The present invention advantageously provides for improving the placement of cells to improve routing around congested regions after global routing has been performed, without causing timing violations in other signal paths on the same integrated circuit device, and doing so in a computationally efficient manner.

These and other advantages of the present invention will become readily apparent from the detailed description of preferred embodiments below.

BRIEF DESCRIPTION OF THE DRAWINGS

FIGS. 4A-4D are diagrams showing exemplary placement of cells and routing of nets during stages of an exemplary method according to the present invention.

FIGS. 6A-6B are diagrams showing an exemplary cell placement and net routing during an exemplary method according to the present invention.

DETAILED DESCRIPTION

Figure 1A:
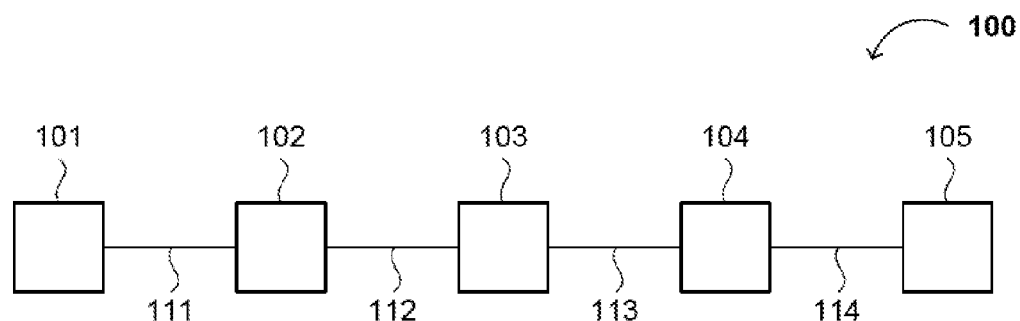
FIG. 1A is a diagram showing a logical view of a signal path.
Figure 1B:
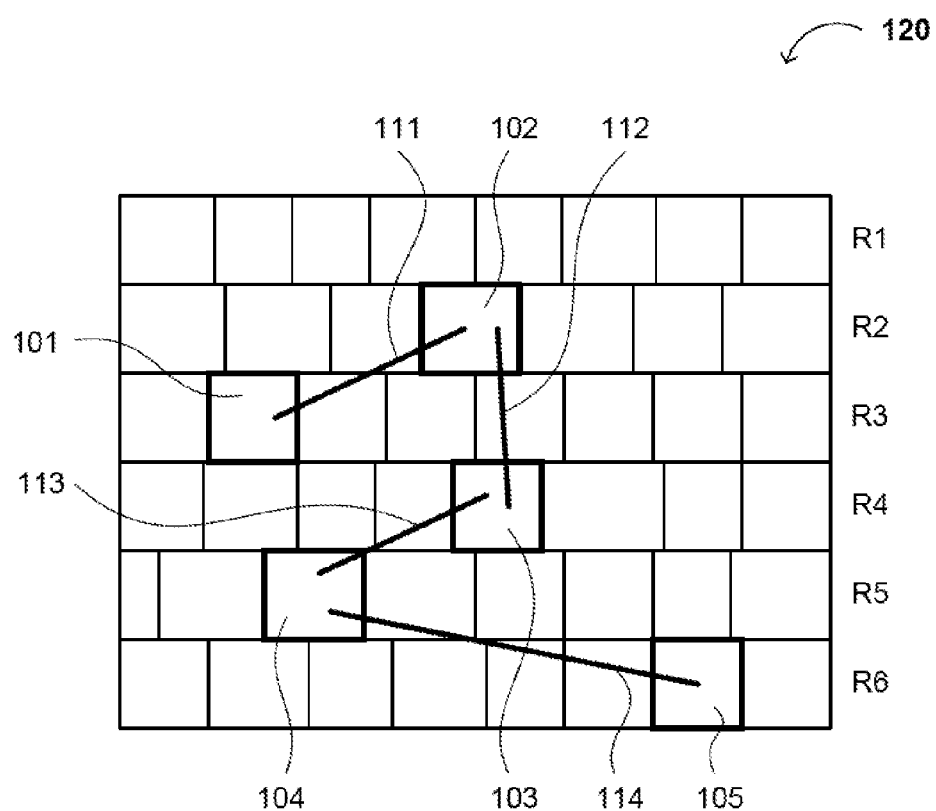
FIG. 1B is diagram showing an exemplary placement of components and nets in a signal path.
Figure 2A:
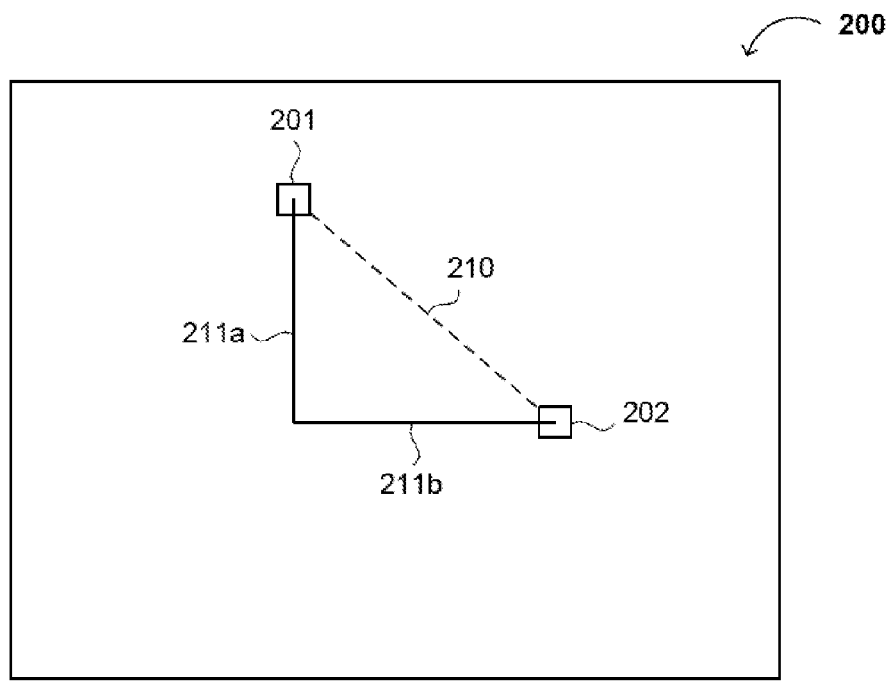
FIG. 2A is diagram showing an exemplary global routing between cells in an integrated circuit layout.
Figure 2B:
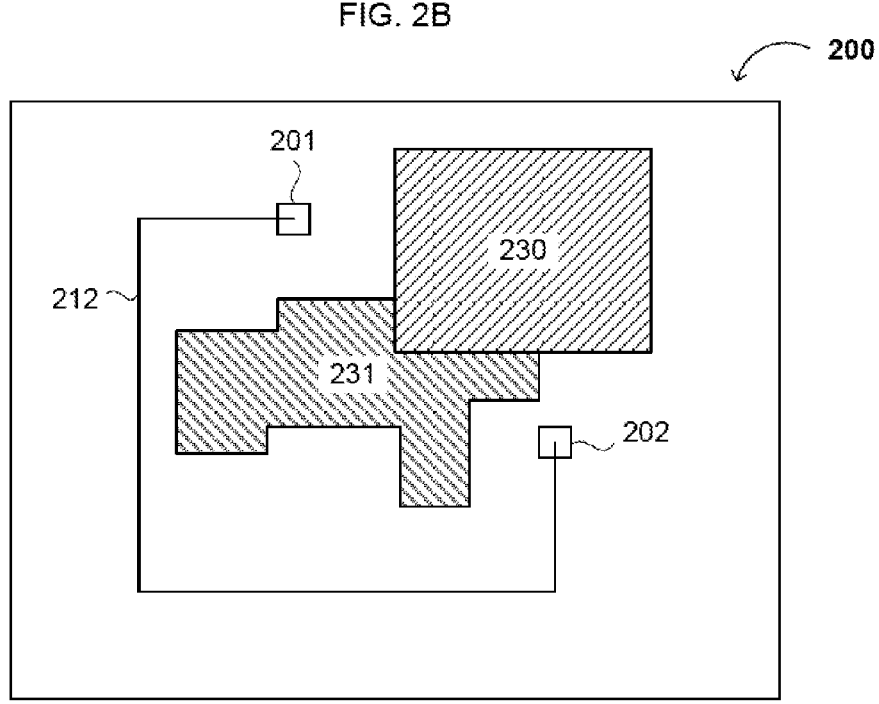
FIG. 2B is a diagram showing an exemplary routing between cells around congested and/or reserved areas of an integrated circuit layout.

Reference will now be made in detail to various embodiments of the invention, examples of which are illustrated in the accompanying drawings. While the invention will be described in conjunction with the following embodiments, it will be understood that the description is not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on code, data bits, data streams, or waveforms within a computer, processor, controller, and/or memory. These descriptions and representations are generally used by those skilled in the data processing arts to effectively convey the substance of their work to others skilled in the art. A process, procedure, logic block, function, process, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer or data processing system. It has proven convenient at times, principally for reasons of common usage, to refer to these signals as bits, waves, waveforms, streams, values, elements, symbols, characters, terms, numbers, or the like, and to their representations in computer programs or software as code (which may be object code, source code or binary code).

It should be borne in mind, however, that all of these and similar terms are associated with the appropriate physical quantities and/or signals, and are merely convenient labels applied to these quantities and/or signals. Unless specifically stated otherwise and/or as is apparent from the following discussions, it is appreciated that throughout the present application, discussions utilizing terms such as "processing," "operating," "computing," "calculating," "determining," "manipulating," "transforming," "displaying" or the like, refer to the action and processes of a computer or data processing system, or similar processing device (e.g., an electrical, optical, or quantum computing or processing device), that manipulates and transforms data represented as physical (e.g., electronic) quantities. The terms refer to actions and processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, in the context of this application, the terms "net list" (or "netlist") and "hardware description" may be used interchangeably to refer to a circuit design represented in an appropriate language, such as VERILOG simulation language, Hardware Description Language (HDL), Very-High-Speed Integrated Circuit Hardware Description Language (which may also be known as VHDL) or VERILOG HDL (VERILOG is a registered trademark of Gateway Design Automation Corporation for computer aided electrical engineering programs). Similarly, the terms "routing" and "placement" may be used together or interchangeably to refer to a placement of integrated circuit cells and/or a routing of nets between cells, which may be represented in an appropriate language such as the Design Exchange Format (DEF), LEF, GDSII, or OASIS.

The terms "wire," "wiring," "line," "signal," "conductor" and "bus" refer to any known structure, construction, arrangement, technique, method and/or process for physically transferring a signal from one point in a circuit to another. The term "net" generally refers to an electronic representation of one or more wires or signals between circuit elements. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

Similarly, for convenience and simplicity, the terms "clock," "time," "timing," "rate," "period" and "frequency" are, in general, interchangeable and may be used interchangeably herein, but are generally given their art-recognized meanings. Also, for convenience and simplicity, the terms "data," "data stream," "waveform" and "information" may be used interchangeably, as may (a) the terms "flip-flop," "latch" and "register," and (b) the terms "connected to," "coupled with," "coupled to," and "in communication with" (which may refer to direct or indirect coupling or communication, unless the context unambiguously indicates otherwise), but these terms are generally given their art-recognized meanings herein.

The invention, in its various aspects, will be explained in greater detail below with regard to exemplary embodiments.

First Exemplary Method

Figure 3:
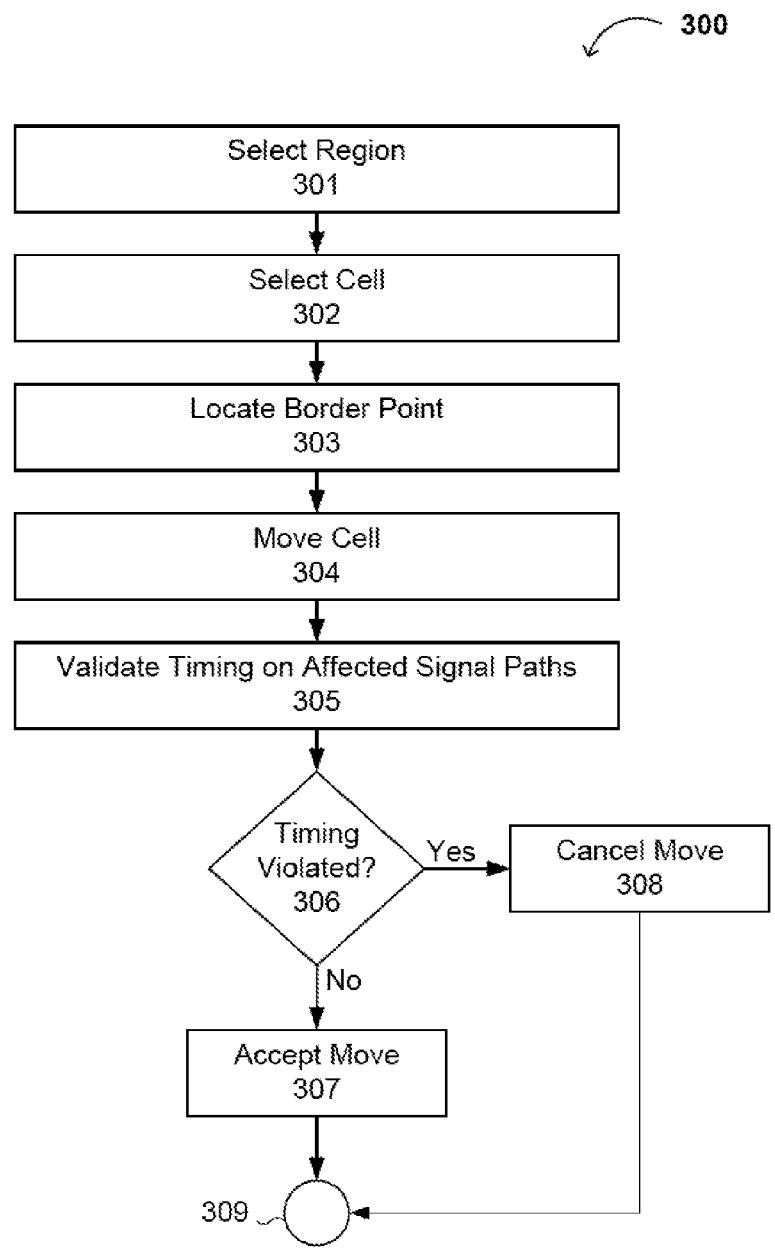
FIG. 3 is a flow chart showing an exemplary method according to the present invention.

In one aspect, the present invention relates to a method for placing (and/or re-placing) integrated circuit cells and routing (and/or re-routing) nets between the cells in an integrated circuit layout. FIG. 3 shows a flowchart 300 of an exemplary method according to the present invention. At 301, a region of cells in the integrated circuit layout is selected. For example, referring now to FIG. 4A, integrated circuit layout 200 may be divided into a grid comprising a number of regions defined by horizontal rows $H1_1$-$H4_1$ and vertical columns $V1_1$-$V4_1$. Thus, at 301, region 401 in row $H3_1$ and column $V3_1$ may be selected.

At 302, a cell is selected within the selected region. Thus, cell 202 may be selected from within region 401. At 303, a border point is located and/or identified, where a net coupled to the selected cell crosses the border of the selected region.

Referring again to FIG. 4A, net 212, coupled to cells 202 and 201, crosses the border of region 401 at border point 402.

At 304, the selected cell (e.g., cell 202) is moved within the selected region (e.g., region 401) in a manner improving a timing characteristic of the portion of the coupled net between the selected cell and the border point (e.g., border point 402). Thus, as shown in FIG. 4B, cell 202 may be moved within region 401 closer to border point 402. The result is that cell 202 is physically further away from cell 201. However, due to the routing of net 212 around congested regions and/or hierarchical blocks 230 and 231, the actual length, capacitance and/or resistance of net 212 is reduced by moving cell 202 closer to border point 402.

Thus, the present method may take advantage of global routing information (e.g., detailed placement and routing information that may be determined by conventional means) to "attract" a cell to a position that improves the routing or signal timing, and accounts for regions around which signals must be routed due to congestion, design rules, hierarchical blocks, and/or other reasons. A person skilled in the art will recognize that conventional methods for moving a cell to improve timing may be adapted for use with the present invention by moving the cell towards a border point, rather than by conventionally moving the cell towards the physical location of the cell at another end of the net.

At 305, the timing of other affected signal paths is validated. For example, if cell 202 is moved as shown in FIG. 4B, then at least the nets coupled to the cell that was formerly in cell 202's new position must be rerouted as a result of the cells swapping or exchanging locations. Referring to FIG. 4C, a second cell 412 in region 401 is coupled to cell 411 in region $H3_1$-$V2_1$ via net 422 (net 212 is shown as a dashed line to distinguish it from net 422). Net 422 crosses the border of region 401 at border point 403. After swapping the locations of cells 202 and 412 (see FIG. 4D), the portion of net 422 in region 401 is rerouted to border point 403. In one embodiment, net 422 is rerouted in the same layout space (e.g., in the same wire track[s]) formerly occupied by net 212 prior to its re-routing, to an optimal or maximum extent (e.g., outside re-placed cell 202, or if possible, within the routing space above re-placed cell 202). Although the portion of net 422 in region 401 increases, and the total length of the portions of nets 212 and 422 within region 401 is about the same before and after the locations of cells 202 and 412 are swapped, the timing of net 422 may still be within a predetermined boundary condition, whereas net 212 may transition from out of compliance with the predetermined boundary condition to within the boundary condition. Alternatively, the amount by which net 212 is out of compliance with the boundary condition may be reduced as a result of the swap. In either case, overall timing of signals in the IC layout is improved.

In addition, other wires that cross over either of the swapped cells 202 and 412 in FIG. 4C may be rerouted, but in one embodiment, such re-routing is minimized. Therefore, for each signal path affected by the move (e.g., for each signal path in which nets are re-routed to accommodate the move), it may be determined whether the new routing causes a timing violation in the signal path. This determination may comprise performing conventional timing analysis on each affected signal path. However, performing such timing analysis can be computationally expensive.

In various embodiments, the method includes determining boundary characteristics or boundary conditions for nets in the signal paths of the integrated circuit. These boundary characteristics or boundary conditions for the nets may include, for example, a maximum capacitance, resistance, length, etc. of the net(s). Thus, at 305, new characteristics for affected nets in the other signal paths may be calculated, and whether the new characteristics are within the boundary characteristics for the affected nets may be determined (e.g., by determining whether the capacitances of the affected nets after re-routing are below the respective maximum capacitances) at 306. The methods of determining boundary characteristics described in U.S. Provisional Patent Application No. 61/349,798, filed on May 28, 2010 and U.S. patent application Ser. No. 13/149,230, filed concurrently herewith, the relevant portions of which are incorporated herein by reference, are effective and computationally efficient for this task.

If the timing requirements of one or more affected signal paths are violated, then at 306, the method proceeds to 308 to cancel or prohibit the move. In some embodiments, after the move is cancelled, a new move or re-placement may be considered (e.g., according to 302-306) for the same cell in the region. For example, the swap between cells 202 and 412 may result in net 422 becoming out of compliance with a boundary condition. However, a swap between cell 202 and a cell between 202 and 412 may be within compliance. In one embodiment, determining whether a selected integrated circuit cell can be swapped with an adjacent integrated circuit cell can be performed in accordance with U.S. Provisional Patent Application No. 61/349,794, filed on May 28, 2010 and U.S. patent application Ser. No. 13/149,258, filed concurrently herewith, the relevant portions of which are incorporated herein by reference. If the timing requirements of one or more affected signal paths are not violated, then at 306, the method proceeds to 307 to accept the move. At 309, the method is complete for one cell.

A Second Exemplary Method

Figure 5:
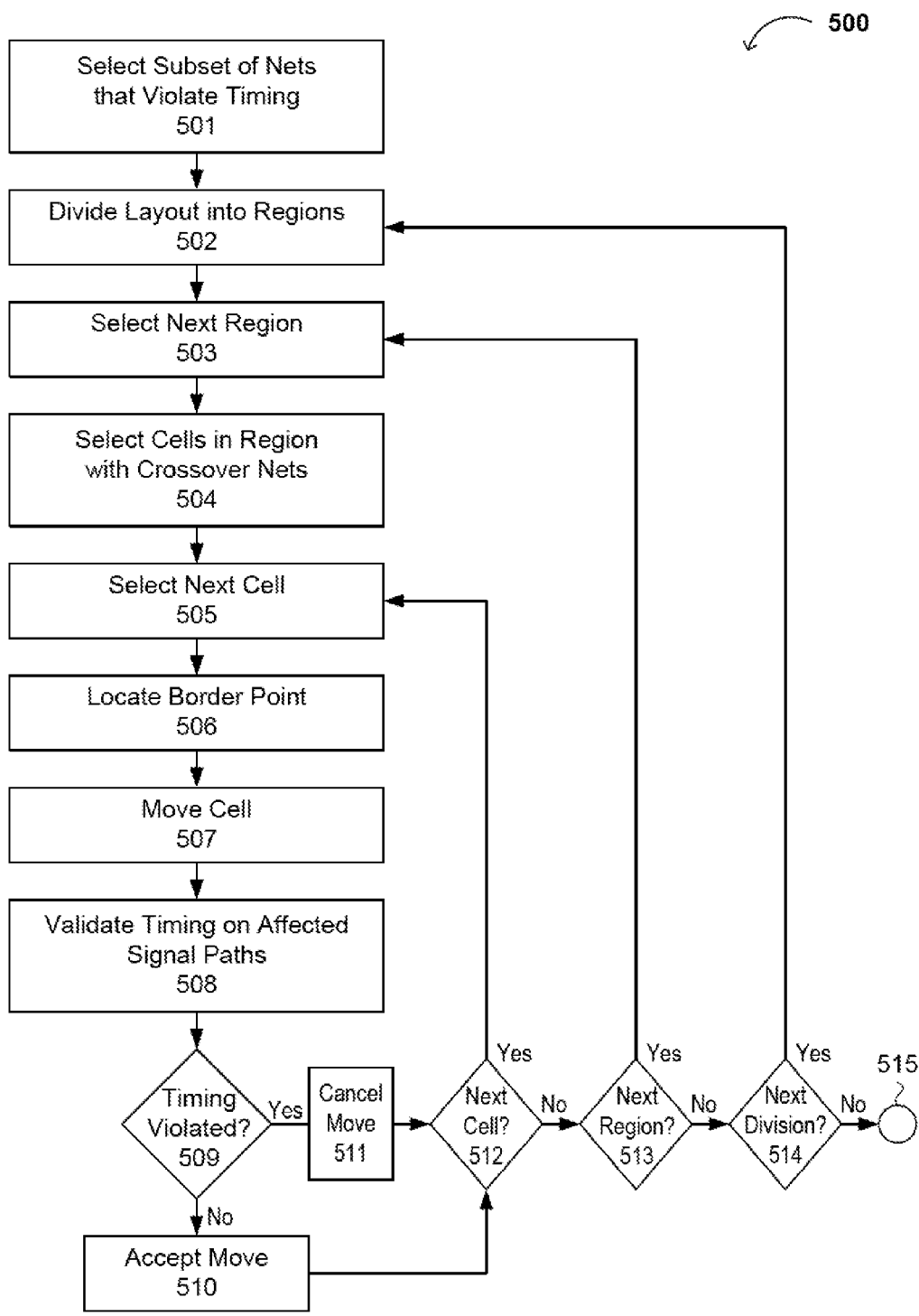
FIG. 5 is a flow chart showing another exemplary method according to the present invention.

In another embodiment, the method operates iteratively on one or more (e.g., a plurality of) nets in different region divisions of the integrated circuit layout. For example, the method may obtain a placement and routing of an integrated circuit layout (e.g., by reading an input file containing the output of a conventional place-and-route software application that includes global routing information) and operating on one or more nets of the layout that violate a timing constraint (e.g., because they have been routed around obstructions or restricted areas, resulting in longer wires than may have been estimated during an initial placement stage). FIG. 5 shows an exemplary method 500 for placing (and/or re-placing) integrated circuit cells and routing (and/or re-routing) nets between the cells in an integrated circuit layout.

At 501, a subset of nets (e.g., nets that violate a timing constraint) in the integrated circuit layout is selected. At 502, the layout is divided into regions. For example, referring to FIG. 4A, integrated circuit layout 200 is divided into regions in horizontal rows $H1_1$-$H4_1$ and vertical columns $V1_1$-$V4_1$. In FIG. 5, 503-513 form a loop for iterating the method the method across different regions. For example, the loop 503-513 may first operate on nets in the region at ($H1_1$, $V1_1$) and proceed to analyze and improve timing of nets in each of the regions through the region at ($H4_1$, $V4_1$). Thus, at 503, the next region (or, during a first iteration of loop 503-513, the first region to be processed) is selected. At 504, cells in the region having nets that cross the region boundary are selected for processing. In some implementations, other processing may be performed on cells whose nets are entirely within the selected region during the same loop 503-513 (see, e.g., U.S. Provisional Patent Application No. 61/349,794, filed on May 28, 2010 and U.S. patent application Ser. No. 13/149,258, filed concurrently herewith, the relevant portions of which are incorporated herein by reference).

A sub-loop 505-512 for iterating through the relevant cells of the selected region may be performed within loop 503-513. A first iteration on a first cell is performed. Thereafter, at 505, the next cell (e.g., another of the cells determined at 504) is selected. For example, referring again to FIG. 4A, if the currently selected region is region 401 at ($H3_1, V3_1$), then cell 202 may be selected at 505. Thus, as described above and as shown in FIG. 4B, after locating/identifying the border point at 506, cell 202 may be moved at 507 within region 401 so that it is closer to border point 402.

At 508, timing is validated on affected signal paths. Again as described above, if cell 202 is moved as shown in FIG. 4B, then at least the nets coupled to the cell that was formerly in cell 202's new position are rerouted. In addition, other wires that cross over either of the swapped cells may be rerouted. Therefore, for each signal path affected by the move (e.g., for each signal path in which nets are re-routed to accommodate the move) it may be determined at 508 whether the new routing causes a timing violation in the signal path. This determination may comprise performing conventional timing analysis on each affected signal path, or it may include calculating new characteristics for affected nets and determining whether the new characteristics are within boundary characteristics for the affected nets (e.g., determining whether the capacitances of the affected nets after re-routing are below the respective maximum capacitances) as described in U.S. Provisional Patent Application No. 61/349,798, filed May 28, 2010 and U.S. patent application Ser. No. 13/149,230, filed concurrently herewith.

If, at 509, the timing requirements of one or more affected signal paths are violated, then the method proceeds to 511 to cancel the move. In some embodiments, after the move is cancelled, a new move may be considered (e.g., according to 507-509 for the same selected cell in the currently selected region, as discussed above with respect to FIG. 3). If the timing requirements of one or more affected signal paths are not violated, then at 510, the move is accepted (e.g., the integrated circuit layout is saved with the new cell location and net routes, a list of desired changes stored, or a signal and/or information otherwise propagated and/or stored indicating that the move is favorable or desirable). In either case, the method then proceeds to 512 to complete the sub-loop 505-512 for the selected cell and determine whether there is another cell to operate on in the currently selected region.

If there are additional cells to select (e.g., additional cells in the current region having one or more nets that cross over the region boundary), then the sub-loop 505-512 is repeated for the next cell. If there are no additional cells in the current region, then the method proceeds to 513 to determine whether there are additional regions to analyze. For example, in FIG. 4B, if the currently selected region is region 401 at ($H3_1, V3_1$) in layout 200, then the method may proceed to perform another iteration of loop 503-513 for the cells of the region at ($H3_1, V4_1$).

The present invention is particularly advantageous when performed across multiple different divisions of (or grids in) an integrated circuit layout. Doing so effectively moves a cell coupled to an out of compliance net until the net is in compliance or the net cannot be further improved. When there are no more regions to analyze in the current division, the method may proceed to 514 to determine whether any iterations for different divisions or grids of the IC layout are to be performed. The method may stop if, for example, a predetermined number of iterations of loop 502-514 have been completed, or the method has been operating for a predetermined amount of time, or all nets have passed timing validation, or an insufficient amount or percentage of timing improvement is obtained following an iteration of loop 502-514, or any combination of the preceding conditions. If, at 514, it is determined that another iteration of loop 502-514 should be performed, then the method proceeds to 502 to divide the integrated circuit layout into a new grid or set of regions.

For example, referring now to FIG. 6A, the method may divide layout 200' (see FIG. 4D) into new horizontal rows $H1_2$-$H5_2$ and new vertical columns $V1_2$-$V5_2$. In this iteration of loop 502-514, cell 202 may be moved (at 507) to a new location closer to new border point 404 to obtain improved timing characteristics for net 212. The result is, as shown in FIG. 6B, that cell 202 is physically further away from cell 201. However, due to the routing of net 212 around congested regions and/or hierarchical blocks 230 and 231, the actual length of net 212 is reduced by moving cell 202 closer to border point 404. Thus, each iteration of the method for different divisions of the layout may incrementally improve the performance of individual nets, while still routing around obstructed or reserved regions of the layout area.

Figure 4A:
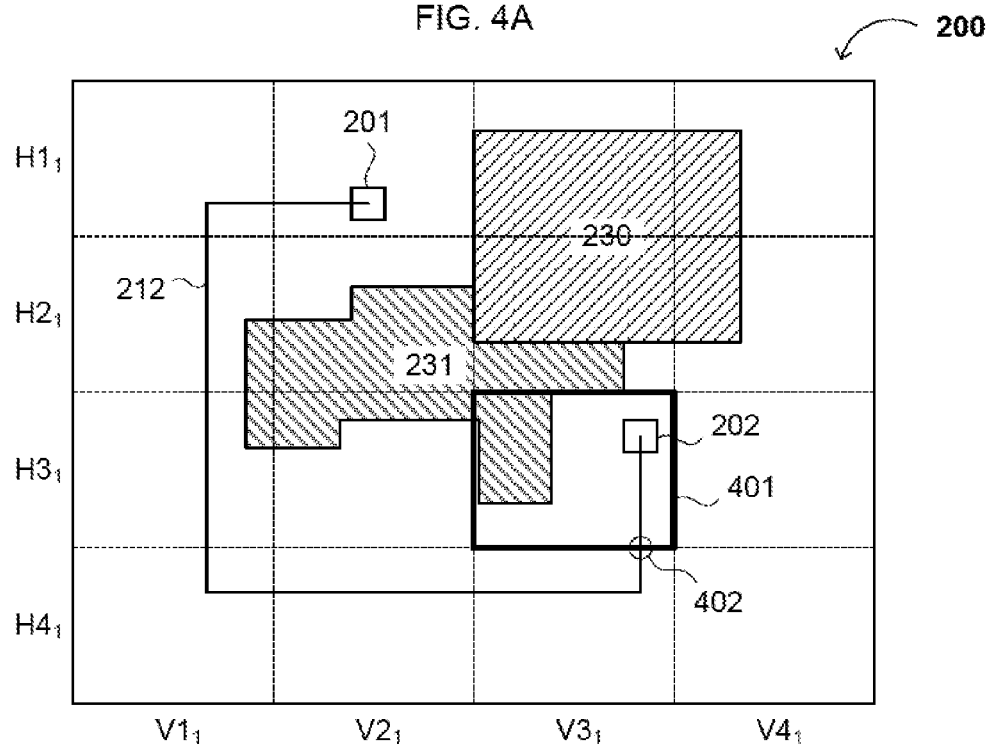
Figure 4B:
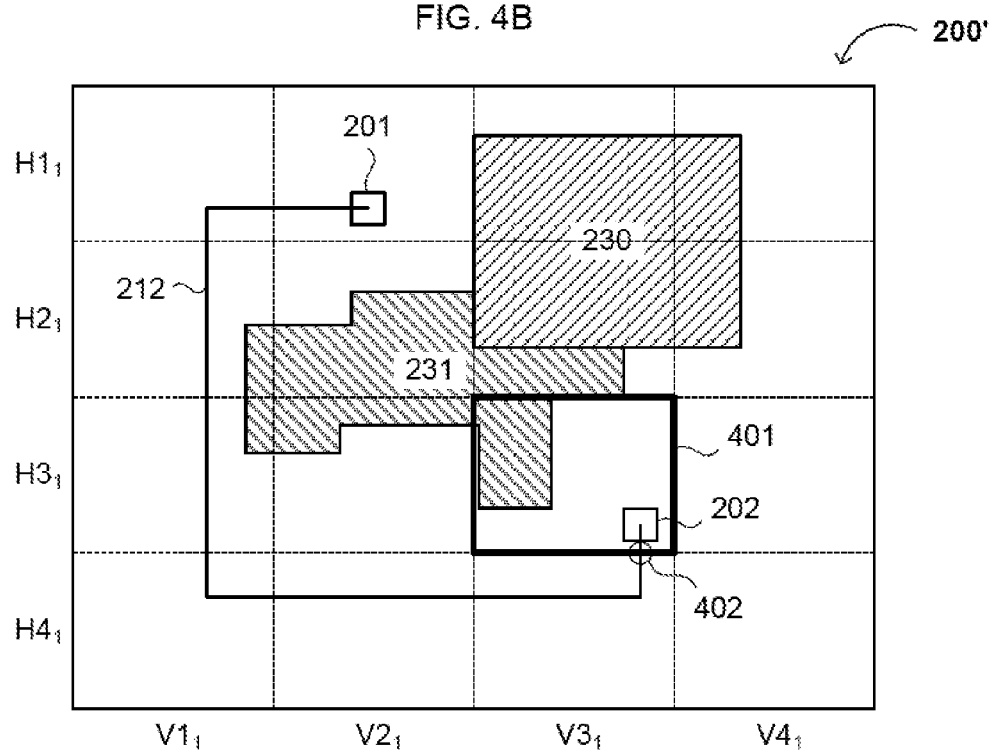

At each iteration of loop 502-514, the division of the layout at 502 may comprise, for example, dividing the layout into equally sized regions as shown in FIG. 4A. However, it is also possible to divide the layout differently in different iterations of the loop 502-514. For example, in some iterations, the region size may be increased and/or decreased (e.g., relative to an earlier iteration). In addition, different regions of the layout may have different sizes and/or shapes in a single iteration of loop 512-514. For example, it may be particularly desirable to examine regions bordering on hierarchical or other reserved blocks (e.g., it may be desirable to examine regions directly adjacent to hierarchical block 230) with relatively high granularity (e.g., using smaller regions) because cells around such blocks are likely to be coupled to nets that have been routed around the hierarchical blocks.

Exemplary Software

A further aspect of the invention relates to software configured to perform one or more of the present methods. The software may be embodied in a computer readable medium (which may be tangible) or waveform comprising a computer executable set of instructions. For example, the software may be stored as executable code, machine object code components, and/or as software source code (e.g., in C, C++, Java, or any other appropriate programming language) on magnetic storage media (e.g., hard disks), flash storage, optical storage, or other physical computer readable media or in a computer readable waveform for transmission on a network or other medium of communication.

Figure 7:
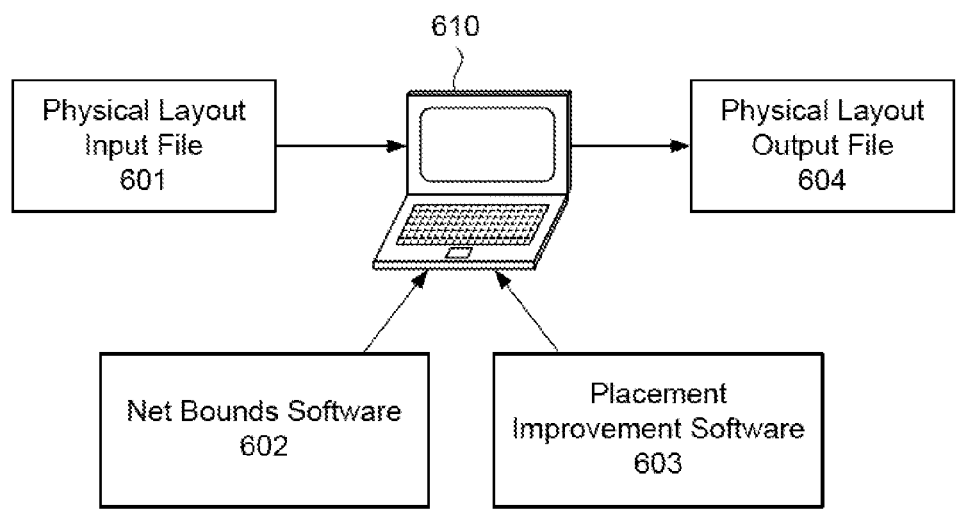
FIG. 7 is a diagram showing a system adapted for use with embodiments of the present invention.

Referring now to FIG. 7, an exemplary system employing the present software is shown. Computer 610 may load and execute signal path improvement software 603 implementing the present methods. Computer 610 may also load and execute net bounds software 602 configured to determine boundary characteristics of signal paths. Examples of suitable net bounds software and uses thereof are described in U.S. Provisional Patent Application Nos. 61/349,798 and 61/349,794, both filed on May 28, 2010 and U.S. patent application Ser. Nos. 13/149,230 and 13/149,258, both filed concurrently herewith, the relevant portions of each of which are incorporated herein by reference. Computer 610 may load an input file 601 containing an initial physical layout of an integrated circuit, including an initial placement of each of the circuit blocks of the signal paths and an initial routing of each of the nets of the signal paths. The input file 601 may be a product of an initial place and route process performed on computer 610, or the product of a process performed on one or more other computers and transmitted to computer 610 (e.g., by attachment of a physical storage medium or by network transmission). The input file may comprise a conventional Design Exchange Format (DEF) file. Alternatively, the input file may comprise a conventional LEF file, GDSII file, or OASIS file.

Placement improvement software 603 may then cause computer 610 to perform the methods described herein to produce new placement and routing. Placement improvement software 603 may use boundary characteristics produced by net bounds software 602 (e.g., to determine boundary capacitances and/or other boundary characteristics for at least one of the nets of the integrated circuit). Computer 610 may also be configured to produce a physical layout output file 604 containing the new placement and routing as determined by placement improvement software 603. The physical layout output file 604 may also comprise a conventional DEF file, or may comprise any other file or data structure suitable for providing placement and routing information for an integrated circuit (e.g., a conventional LEF file, GDSII file, or OASIS file). In this fashion, a conventional ASIC type design flow including synthesis can be adapted for placement of cells and routing of signal paths between the cells in accordance with embodiments of the present invention.

Further examples of suitable systems, tools and/or methods in which the present invention is generally applicable include those described in, e.g., U.S. Pat. Nos. 6,080,201 and 5,798,936, the relevant portions of which are each incorporated herein by reference, and those commercially available from place-and-route software vendors such as Cadence Design Systems (e.g., the SILICON ENSEMBLE™, SILICON ENSEMBLE-PKS™, FIRST ENCOUNTER™, and NANO ENCOUNTER™ tools), Silicon Valley Research, Inc. (e.g., the QIC/APR™, GARDS™, SC™ and FLOORPLACER™ tools), Synopsys (e.g., the CHIP ARCHITECT™, DESIGN COMPILER™, and FLOORPLAN COMPILER™ tools) and Mentor Graphics (e.g., the AUTOCELLS™ tool).

CONCLUSION/SUMMARY

Thus, the present invention provides methods and software for placing cells and routing wires in an integrated circuit layout. The present invention advantageously improves the placement of cells to improve routing around congested regions after global routing has been performed, without causing timing violations in other signal paths on the same integrated circuit device. Embodiments of the present invention are computationally efficient relative to conventional methods, and have been found to produce timing improvements that otherwise might not be found in an automated fashion.

The foregoing descriptions of embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of placing or re-placing cells in an integrated circuit layout and routing or re-routing nets between said cells in said integrated circuit layout, said method comprising:

selecting a region of said integrated circuit layout;
selecting one of said cells within said selected region;
locating a border point where a net coupled to said selected cell crosses a border of said selected region; and
using computing hardware, moving said selected cell within said selected region to improve a timing characteristic of a portion of said coupled net between said selected cell and said border point.

2. The method of claim 1, wherein said timing characteristic comprises a wire length or capacitance of said portion of said coupled net.

3. The method of claim 1, wherein said selected cell is moved closer to said border point.

4. The method of claim 1, further comprising obtaining an initial placement and routing of said integrated circuit layout.

5. The method of claim 1, further comprising determining whether moving said selected cell causes a timing violation in one or more signal paths of said integrated circuit layout that do not include said net.

6. The method of claim 5, further comprising determining one or more boundary characteristics for nets in said one or more signal paths.

7. The method of claim 6, wherein determining whether moving said selected cell causes timing violations comprises:
calculating one or more new characteristics for affected nets in said one or more signal paths after moving said selected cell; and
determining whether said new characteristic(s) are within said boundary characteristic(s) for said affected nets.

8. The method of claim 1, further comprising:
dividing said integrated circuit layout into a first plurality of regions, wherein said selected region comprises one of said first plurality of regions; and
after moving said selected cell, dividing said integrated circuit layout into a second plurality of regions and repeating locating said border point and moving steps for said selected cell in a new region selected from the second plurality of regions.

9. The method of claim 1, wherein said coupled net violates a timing constraint and is coupled to a second cell not in said selected region.

10. A method of re-placing integrated circuit cells and re-routing nets between said cells in an integrated circuit layout, said method comprising:
selecting a subset of said nets, wherein said nets in said subset violate a timing constraint; and
performing the method of claim 1 for each of said nets in said subset.

11. A non-transitory computer readable medium comprising a tangible computer executable set of instructions adapted to place or re-place cells in an integrated circuit layout and routing or re-routing nets between said cells in said integrated circuit layout, said instructions being adapted to:
select a region of said integrated circuit layout;
select one of said cells within said selected region;
locate a border point where a net coupled to said selected cell crosses a border of said selected region; and
move said selected cell within said selected region to improve a timing characteristic of a portion of said coupled net between said selected cell and said border point.

12. The computer readable medium of claim 11, wherein said timing characteristic comprises a wire length or capacitance of said portion of said coupled net.

13. The computer readable medium of claim 11, further comprising one or more instructions adapted to obtain an initial placement and routing of said integrated circuit layout.

14. The computer readable medium of claim 11, further comprising one or more instructions adapted to determine whether moving said selected cell causes a timing violation in one or more signal paths of said integrated circuit layout that do not include said net.

15. The computer readable medium of claim 14, further comprising instructions adapted to apply one or more boundary characteristics to nets in said one or more signal paths.

16. The computer readable medium of claim 15, wherein said boundary characteristic(s) comprise a maximum capacitance or a maximum length.

17. The computer readable medium of claim 15, wherein determining whether moving said selected cell causes timing violations comprises:
   calculating one or more new characteristics for affected nets in said one or more signal paths after moving said selected cell; and
   determining whether said new characteristic(s) are within said boundary characteristic(s) for said affected nets.

18. The computer readable medium of claim 11, further comprising instructions adapted to divide said integrated circuit layout into a first plurality of regions, wherein said selected region comprises one of said first plurality of regions.

19. The computer readable medium of claim 18, further comprising one or more instructions adapted to, after moving said selected cell, divide said integrated circuit layout into a second plurality of regions and repeat locating said border point and moving steps for said selected cell in a new region selected from the second plurality of regions.

20. The computer readable medium of claim 11, wherein said coupled net violates a timing constraint and is coupled to a second cell not in said selected region.

* * * * *